Figure 1:
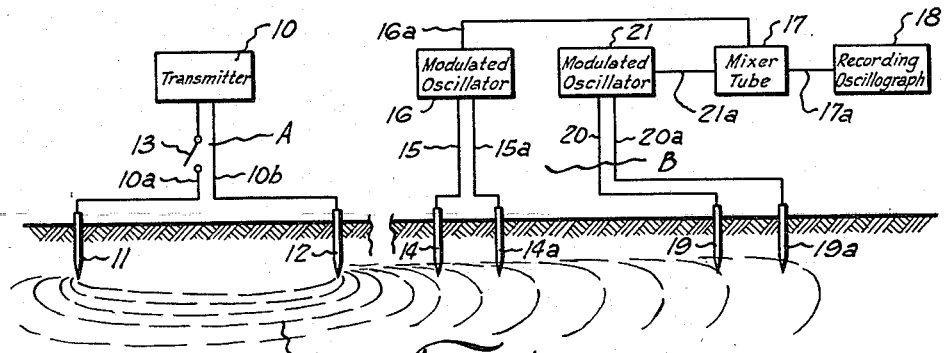

March 17, 1942.   G. M. HOWARD   2,276,974
METHOD OF AND MEANS FOR DETERMINING THE VELOCITY OF PROPAGATION
OF WAVES THROUGH SUB-SURFACE FORMATIONS
Filed June 14, 1940

Inventor
Gerald M. Howard

Attorney

Patented Mar. 17, 1942

2,276,974

UNITED STATES PATENT OFFICE 2,276,974

METHOD OF AND MEANS FOR DETERMINING THE VELOCITY OF PROPAGATION OF WAVES THROUGH SUBSURFACE FORMATIONS

Gerald M. Howard, Dallas, Tex.

Application June 14, 1940, Serial No. 340,502

14 Claims. (Cl. 175—182)

This invention relates to new and useful improvements in methods of and means for determining the velocity of propagation of waves through sub-surface formations.

One object of the invention is to provide an improved method and means for receiving, and recording the velocity of propagation of, electrical currents or sound waves, which is particularly adaptable for use in geophysical prospecting, whereby the conductivity structure, and other properties of the subsurface formations may be accurately determined.

An important object of the invention is to provide an improved receiving and recording method, of the character described, which makes possible the measurement of very small time differences in the velocity of travel of electrical or seismic waves through the sub-surface formation, whereby accurate information as to the formation through which the waves propagate may be obtained.

A particular object of the invention is to provide an improved method, of the character described, wherein the currents or waves travelling through the sub-surface formation are received at spaced points and are utilized to actuate vacuum tube oscillators, after which the output of the oscillators is compared to denote the velocity of propagation of the current or waves through the formation.

Another object of the invention is to provide an improved apparatus, of the character described, which includes an arrangement of vacuum tube oscillators which are located at spaced points and which are arranged to receive the waves travelling through the sub-surface formations, whereby the frequency of each oscillator is varied in accordance with the received waves; said apparatus also providing means for comparing the frequency variation of one oscillator to the frequency variation of the other oscillators or for comparing the frequency variation of each oscillator with an auxiliary reference oscillator of a constant frequency, or for comparing the frequency variation of each receiving oscillator with the known frequency variation of an oscillator which is actuated by the current, as originally transmitted into the earth; any of the foregoing comparisons providing accurate information as to the velocity of travel of the waves through the earth and thereby making possible the determination of the conductivity structure and other properties of the sub-surface formations through which the waves are propagated.

Still another object of the invention is to provide an apparatus, wherein a mixer tube is employed in conjunction with the oscillators under comparison, whereby very small differences in frequency variations may be measured, which permits small differences in time to be recorded, thereby yielding accurate information relative to the sub-surface structure.

A further object of the invention is to provide an improved apparatus which may include either receiving electrodes for receiving electrical waves or a seismometer for receiving seismic waves; the electrodes or seismometer, as the case may be, being arranged to be connected with an ordinary recording device, such as a mechanical oscillograph or a cathode-ray oscilloscope whereby a visible record of the waves, and measurements taken, may be had.

A construction designed to carry out the invention will be hereinafter described, together with other features of the invention.

Figure 2:
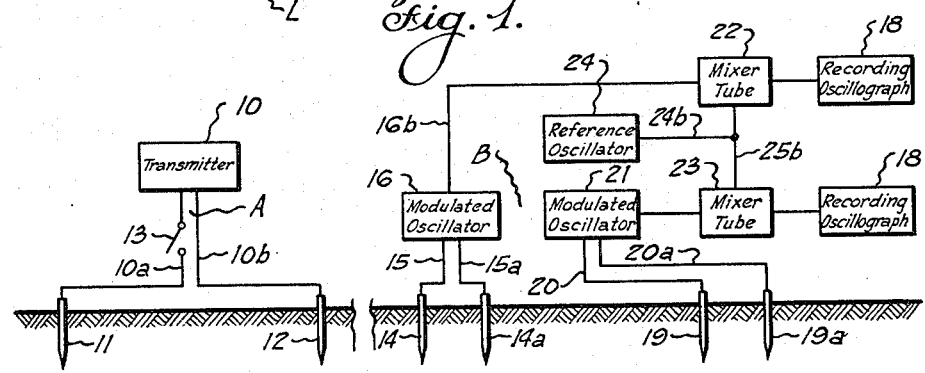
Figure 3:
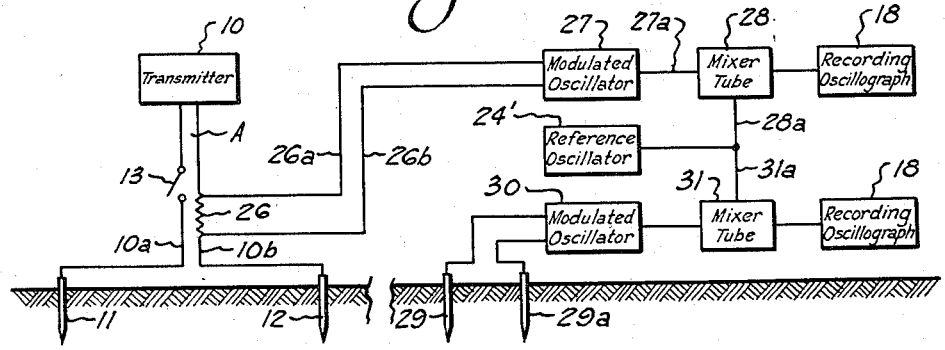
Figure 4:
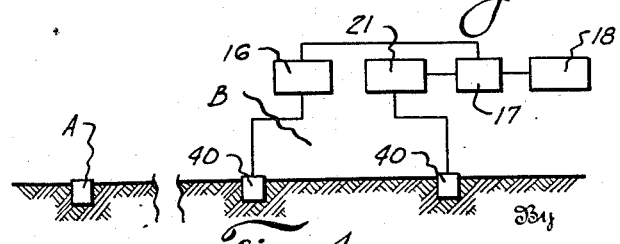

The invention will be more readily understood from a reading of the following specification and by reference to the accompanying drawing, in which an example of the invention is shown, and wherein:

Figure 1 is a diagram of one type of apparatus, constructed in accordance with the invention, for carrying out the improved method, Figure 2 is a diagram of another type of apparatus, Figure 3 is a similar view of still another form of apparatus, and Figure 4 is a diagram of the receiver employed in seismograph work.

It is well known that various methods of geophysical exploration have come into general use for determining the nature and characteristics of the sub-surface formations. Certain of these methods employ electrical current which is sent into, or induced in, the ground and caused to travel or propagate through the sub-surface formations. Other methods, generally known as seismic methods, transmit sound or seismic waves through the sub-surface strata. Regardless of whether an electrical or seismic method is practiced, all methods include receiving and measuring equipment for taking various measurements of the currents or waves after the same have traversed the sub-surface strata, whereby the resistivity, conductivity and other properties of such strata may be determined.

It has been found that the velocity of propagation or the rate of travel of the currents or waves through the sub-surface formations is an important factor in yielding information as to the nature and characteristics of the formations and in order to accurately determine this velocity or rate of propagation, time must be measured. That is, the time required for the currents or waves to travel from one point to another is dependent upon the rate or velocity of travel through the formation. Therefore, in order to determine the velocity of travel, the required time of travel between points must be ascertained and unless an accurate measurement of time difference can be obtained, reliable and accurate information as to the strata through which the currents or waves travel cannot be had.

The present invention contemplates a method and apparatus for accurately measuring and recording time differences, regardless of how small such differences may be, and the invention may be used in combination with any of the present electrical or seismic methods of geophysical exploration now in general use. In other words, any suitable transmitting apparatus or unit for inducing electrical currents in the earth or for transmitting and propagating seismic waves through the earth may be employed. The invention will be described in combination with an electrical prospecting method employing a transmitter, such as disclosed in my co-pending application Serial No. 265,556, filed April 1, 1939, but it is to be understood that any suitable transmitting apparatus may be used.

Referring to Figure 1, the letter A designates a transmitting unit which is arranged to generate and transmit an electrical current into the earth. The transmitting unit includes a transmitter 10 which may be of any desired type capable of generating an electrical current. The transmitter is connected through lead wires 10a and 10b with ground rods or electrodes 11 and 12, which are driven into the earth at spaced points. A switch 13, connected in the wire 10a, controls the completion of the transmitting circuit and when said switch is closed, the transmitter sets up a flow of electrical current which passes through the wire 10a to the rod or electrode 11, then through the earth to the electrode 12 and then back to the transmitter. The flow of current through the earth between the electrodes sets up an electrical or electromagnetic field, generally referred to as an induction field and indicated by the lines L in Figure 1. The depth of penetration of this field into the earth will be some function of the distance between the electrodes 11 and 12, as well as of the frequency of the transmitted current and, manifestly, by varying the distance between the electrodes, or by changing the frequency of the current, the depth of penetration, or in effect, the size of the field L may be changed. Thus, the spacing of the electrodes and the frequency employed is dependent upon the conditions of the area being explored and is subject to variation.

The transmitter 10, as has been stated, may be of any desired type but it is preferable to employ a transmitter which will transmit a damped wave into the earth. As is well known, a damped wave is one in which the value decreases at a non-uniform and known rate as time elapses. One form of transmitter which has been found suitable is a charged condenser. As the condenser discharges itself, the value of the current gradually decreases from maximum to zero, such decrease being at a non-linear rate with relation to time. When a transmitter of this type is used, the electrical field L is set up and the current gradually and progressively decreases in value until zero is reached.

The creation or setting up of the induction field L will cause the propagation of lines of force outwardly through the sub-surface formations in all directions. The velocity of propagation of the lines of force, or the rate of expansion of the electrical field, will be a function of the physical properties of the formations through which the current or electrical waves travel. For example, one stratum or formation may be porous with water entrained therein, with the result that such stratum would be highly conductive with low resistivity to the passage of electrical waves, and said waves will travel at a low velocity therethrough; another stratum or formation, not so porous, might be less conductive with higher resistivity, whereby the electrical waves propagate therethrough at a higher velocity. Of course, the difference in the rate of travel through different strata is very slight but may be measured by measuring the time required for the passage of waves therethrough. The small time differences denote the rate of travel or velocity of propagation of the waves through the various strata or formations.

For receiving the electrical waves after they have transversed the sub-surface formations, and for measuring and recording the velocity of propagation thereof, a receiving unit B is provided. This unit is spaced any desired distance from the transmitting unit A and includes a receiving means which is shown as a pair of receiving electrodes 14 and 14a, but which may be a wire loop or other type of electrical receiver. The electrodes may take the form of metallic rods which are driven into the ground. As is clearly shown in Figure 1, the electrodes 14 and 14a are spaced from each other and are electrically connected, by wires 15 and 15a with a modulated vacuum tube oscillator 16. The oscillator may be of standard construction and may be any frequency, either high or low, although if the higher frequencies are employed, smaller time differences may be more accurately measured. The oscillator 16 is electrically connected by a wire 16a, with a mixer tube 17, whereby the output of said oscillator is conducted to said tube. A suitable recording device 18, which has a timing wave on the record, is connected by a wire 17a with the mixer tube 17 and this recording device may be of any desired construction as, for example, a string galvonometer type oscillograph or a cathode-ray oscilloscope. The output of the mixer tube is registered or visible recorded on the recording device 18.

The receiving unit B also includes a second pair of receiving electrodes 19 and 19a which are properly spaced from each other. The electrodes 19 and 19a are also spaced a desired distance from the other pair of electrodes 14 and 14a of the receiving circuit. Wires 20 and 20a connect the electrodes 19 and 19a with a second modulated oscillator 21 which is also electrically connected, through the conductor 21a, with the mixer tube 17. Thus, it will be seen that both oscillators 16 and 21 are electrically connected with the mixer tube, whereby the output or frequencies of both oscillators is connected to said tube.

If the frequency of the oscillator 16 is identical with the frequency of the oscillator 21 and both frequencies are fed into the mixer tube, then the output of the mixer tube will be equal to the sum and difference of the frequencies of the two oscillators (16 and 21) or zero in the case of the difference and two times the frequency of one oscillator in the case of the sum. Since the recording apparatus will not respond to such high frequencies as the sum, only the difference in frequency of the two oscillators will be recorded which in this case is nil. However, if the frequency of one oscillator is different from the frequency of the other, the difference in such frequencies will be emitted from the mixer tube and will be registered on the recording device 18. As explained, the recording device has a timing wave on the record showing the difference in number of cycles per second between the oscillations of the two oscillators.

In practicing the method and using the apparatus, the oscillators 16 and 21 are first adjusted so that the frequency of both oscillators is identical. Where a damped wave is transmitted by the transmitting unit A, the oscillators are adjusted so that as the transmitted current varies from its maximum value to minimum value, the frequency of both the oscillators varies, as for example, from 2,000,000 cycles to 2,000,100 cycles per second. Of course, if current of a steady valve is transmitted, the frequency of both is the same.

The receiving electrodes 14 and 14a are disposed within the area of the expanding electrical field, as are the electrodes 19 and 19a. However, the latter electrodes are spaced some distance from the electrodes 14 and 14a, whereby the current, after contacting the electrodes 14 and 14a must flow through a sub-surface formation before reaching the electrodes 19 and 19a. When current is transmitted into the earth by the transmitting unit A, this current is propagated through the sub-surface formations and is received by the electrodes 14 and 14a and is utilized to modulate the oscillator 16 and thereby vary the frequency thereof in accordance with the received current. Similarly, the reception of current by the electrodes 19 and 19a results in a change in the frequency of the oscillator 21.

Prior to the transmission of current by the unit A, the output of the oscillators 16 and 21 has been adjusted to the same frequency so that the output of the mixer tube is nil and no indication appears on the recording device 18. As soon as the transmitting unit A is actuated, the electrical field L is set up within the formation and said field expands outwardly in all directions. As current is received by the electrodes 14 and 14a, the frequency of the oscillator is immediately changed in accordance with such current and as soon as this occurs, there is a difference in frequency between the oscillator 16 and the other oscillator 21. Such frequency difference is emitted from the mixer tube 17 and is registered on the recording instrument 18.

Immediately following the reception of the current by the electrodes 14 and 14a, current is received by the second pair of electrodes 19 and 19a, whereby the frequency of the oscillator 21 is varied. If both pairs of electrodes 14 and 14a and 19 and 19a were disposed side by side, the frequency variation of both oscillators 16 and 21 would be identical because the current received by both pairs of electrodes would have passed through the same formations and would have been received at the same instant. However, since the electrodes 19 and 19a are spaced from the electrodes 14 and 14a and are further away from the transmitting unit A, there is a difference in the time of reception of the current by the two pairs of electrodes. This time difference may be readily calculated because the spacing between the two pairs of receiving electrodes is known.

The rate of expansion of the electrical field L is a function of the resistance of the medium through which it is expanding so that if the formation between the two pairs of receiving electrodes is homogeneous, then the rate of expansion of the field at both pick-up points is identical. This results in an identical variation of the frequencies of the two oscillators 16 and 21, with the exception of the delay in the point of time due to the electrodes 19 and 19a being further from the transmitting unit than the electrodes 14 and 14a. Such time delay, as has been explained, is known and is taken into consideration. Thus, it is obvious that when the formation between the receiving points is homogeneous, the frequency variation in the two oscillators, as caused by the reception of current at such two points, is the same. As explained, the recording device 18 registers the difference in the frequency output of the oscillators and in cases where the formation between the receiving points is homogeneous, the only difference in frequencies is that caused by the time difference due to the spacing between the receiving points.

If the formation between the two receiving points is not homogeneous, it is apparent that the frequency variation of the oscillator 16 is considerably different than the frequency variation of the oscillator 21. For example, if one stratum terminates at some point between the electrodes 14 and 14a and the electrodes 19 and 19a, or if the stratum does not have a uniform thickness, then the rate of expansion of the electrical field at the electrodes 14 and 14a is different than the rate of expansion at the electrodes 19 and 19a. Such difference in the rate of expansion of the field results in a variation of earth current received by the two pick-up points and therefore, the two oscillators 16 and 21 will not follow the same variation in frequency. The difference in the frequencies of the two oscillators is registered by the recording instrument 18 and from such indication, the velocity of propagation or rate of travel of the current through the formation may be determined. The difference in the velocity of propagation of the current at the two pick-up points is indicative that a change in sub-surface structure is present at some point between the electrodes 14 and 14a and the electrodes 19 and 19a. By moving the receiving unit to various positions relative to the transmitting unit A and taking measurements at each of such positions, and then correlating the information so obtained an accurate analysis of the sub-surface structure may be obtained. The use of the oscillators, together with the mixer tube permits an accurate measurement of minute differences in time and therefore, any slight change in sub-surface structure between the two receiving points is indicated.

The form of receiving apparatus illustrated in Figure 1 will accurately indicate any changes in the formation which is located between the electrodes 14 and 14a and the electrodes 19 and 19a. The difference in the frequencies of the oscillators is the output frequency of the mixer tube and with this form of the invention, it is impossible to tell which oscillator is operating at a greater or a lesser frequency than the other.

In other words, with the apparatus shown in Figure 1, the difference between the frequencies of the oscillators is shown but there is no indication as to which oscillator is operating at a greater or a lesser frequency. In order to determine which of the oscillators is operating more or less rapidly, the hook-up shown in Figure 2 may be employed. In this arrangement, the oscillator 16 is connected by means of a wire 16b with a mixer tube 22, which is constructed in the same manner as the mixer tube 17 of the first form. The oscillator 21 is connected to a second mixer tube 23 and each of the tubes 22 and 23 have connection with a suitable recording instrument 18. Thus, it will be seen that instead of only one mixer tube and one recording instrument, the form shown in Figure 2 employs two mixer tubes and two recording instruments.

In addition, a reference oscillator 24 is provided and this oscillator is arranged to operate at a fixed or known frequency. The reference oscillator is connected by means of a wire 24b to the mixer tube 22 and in addition has connection through a wire 25b with the mixer tube 23.

In the operation of this form, the oscillators 16 and 21 are adjusted so as to operate at a known frequency, exactly as has been described. The reference oscillator 24 is also actuated so that its output is at a predetermined or known frequency. If desired, the adjustment of the oscillators may be such that all three of said oscillators normally have the same frequency of oscillation. Through the use of the reference oscillator and the particular hook-up shown, the frequency of the oscillator 16 may be compared with the frequency of the reference oscillator 24 by means of the mixer tube 22 and such comparison is registered on the recording instrument 18 which is connected with the tube 22. Similarly, the frequency of the oscillator 21 may be compared with the reference oscillator 24 through the mixer tube 23 and such comparison registered on the recording instrument 18 which has connection with said tube 23.

The form shown in Figure 2 is employed in the same manner as has been described with reference to Figure 1. However, instead of comparing the frequency of the two oscillators 16 and 21, the frequency of each of these oscillators is individually compared to a standard or reference oscillator 24. Therefore, any variation in the frequency of the oscillators 16 and 21, which is of course caused by the current received through the earth by the electrodes 14, 14a, 19 and 19a, is individually registered on the recording instrument 18. In this form, as in the form shown in Figure 1, an analysis of the formation between the two receiving points may be accurately obtained.

In the forms shown in Figures 1 and 2, the frequency of one oscillator is compared to the frequency of another oscillator, so as to determine the structure of the formation between the two receiving points which have connection with said oscillator. In these forms, there is no way of determining the structure of the formation between the transmitting unit A and the points of reception. In Figure 3, an apparatus which is adapted for analyzing the formation between the transmitting unit A and a given point of reception, is shown. In such apparatus, the transmitting circuit is provided with a resistance 26 which is connected in the wire 10b. A pair of lead wires 26a and 26b extend from the opposite sides of the resistance to a modulated oscillator 27, which oscillator is comparable to the oscillator 16 in the first form. The oscillator 27 is connected by a wire 27a to a mixer tube 28 and said tube is, in turn, connected with a recording instrument 18. The mixer tube 28 is also connected through a wire 28a with a reference oscillator 24', which is exactly the same in construction as the oscillator 24 in the form shown in Figure 2.

The receiving unit in this form of the invention comprises a pair of receiving electrodes 29 and 29a which are connected to a modulated oscillator 30. This oscillator has electrical connection with a mixer tube 31, which tube is connected through a wire 31a to the reference oscillator 24'. The mixer tube 31 is also electrically connected with a recording instrument 18.

The operation of this form of the invention is obvious. The reference oscillator 24' is adjusted so as to maintain a constant frequency as for example 2,000,000 cycles. The two modulated oscillators 27 and 30 are adjusted to a frequency of 2,000,000 cycles with no current flowing from the transmitting unit A. When the transmitter is operated the current flows into the earth and a voltage drop occurs across the resistance 26. As this voltage drop across the resistance 26 varies due to the fact that the transmitter is generating a damped wave, such variation in the voltage drop causes the frequency of the modulated oscillator 27 to vary proportionally. This change in the frequency of the oscillator 27 is registered on the recording instrument 18 which has connection with the mixer tube 28. Thus, it will be seen that the frequency of the oscillator 27 will vary in accordance with the current which is sent into the earth by the transmitting unit A. The other modulated oscillator 30 which is connected to the electrodes 29 and 29a is varied in accordance with the current received, after said current has traversed the formation. The variation in the frequency of the oscillator 30 is registered on the recording instrument 18 and obviously, a comparison of the sent current, with the received current, may be readily made by observing the two recording instruments 18. The arrangement permits a very accurate measurement of small time differences, whereby the velocity or the rate of travel of the electrical current through the subsurface formation may be noted. In this form of the invention, the formation between the transmitting unit A and the receiving electrodes 29 and 29a is analyzed.

The receiving and measuring apparatus and method described above is used with an electrical method and is also adapted for use in seismograph work, wherein seismic waves are propagated through the formation. The only change which is necessary in the apparatus to make the same applicable for use in seismic methods is to substitute a seismometer or microphone 40 (Fig. 4) for each pair of receiving electrodes in the forms shown in Figures 1 to 3. This seismometer is usually buried below the ground level and receives the sound waves and converts them into electrical waves which are conducted to the oscillators, mixer tube or tubes and recording device, or devices, as explained. The operation of the oscillators, and their associate parts is identical regardless of the type of receiving means, whether the electrodes or the seismometer, is employed.

From the foregoing it will be seen that a simple and effective apparatus and method for receiving electrical current and measuring time differences to ascertain the velocity of propagation is had. In all forms of the invention, an arrangement of vacuum tube oscillators is employed as the frequency variation of the oscillators is compared, either with an oscillator of a constant frequency, or with another oscillator whose frequency is varied according to the current put into the earth or taken out of the earth. The frequencies of the oscillators to be compared are fed into the mixer tubes so that the output of said tubes will be the difference between the frequencies under comparison. It is pointed out that if the oscillators are operated at radio frequency, the mixer tube could be replaced by an ordinary radio receiving set, which set will act in the same way to produce the desired result. The receiving apparatus is such that any desired type of transmitter may be employed and this makes the invention applicable for use in combination with any of the well known electrical or seismic methods of geophysical prospecting. A recording oscillograph or an oscilloscope has been described as being suitable for the recording instrument, but obviously any other recording device could be employed. It is noted that if desired, a cathode-ray oscilloscope may be employed and may be connected to the mixers of Figures 2 and 3 so that the output of one tube is impressed on the horizontal plates of the oscilloscope, while the output of the other mixer is impressed on the vertical plates, whereby the plates create the well known Lissajou figure. In this instance, only a single recording device is need be used in place of the two recorders shown in Figures 2 and 3.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The method of determining the velocity of propagation of electrical or seismic waves through a sub-surface formation which includes, utilizing the waves for varying the frequencies of devices generating electrical oscillations, and then comparing the variations in the frequencies of said devices to ascertain the differences therebetween and thereby determine the velocity of propagation of the waves through the formation.

2. The method of determining the velocity of propagation of electrical or seismic waves through a sub-surface formation which includes, utilizing the waves at one point in the sub-surface formation for varying the frequency of the output of an electrical oscillating device, whereby said frequency is varied in accordance with the value of such waves, utilizing the waves at a point spaced from the first point for varying the frequency of the output of a second electrical oscillating device, and comparing the variations in the frequencies of the two oscillating devices to ascertain the difference therebetween and thereby indicate the rate of travel of the waves through the sub-surface formation between the two points.

3. The method of determining the velocity of propagation of electrical or seismic waves through a sub-surface formation which includes, utilizing the waves at one point in the sub-surface formation for varying the frequency of the output of an electrical oscillating device, whereby said frequency is varied in accordance with the value of such waves, utilizing the waves at a point spaced from the first point for varying the frequency of the output of a second electrical oscillating device, comparing the variations in the frequencies of the two oscillating devices to ascertain the difference therebetween, and visibly registering said difference to indicate the rate of travel of the waves through the formation between the two points.

4. The method of determining the velocity of propagation of electrical or seismic waves through a sub-surface formation which includes, utilizing the waves for varying the frequencies of devices generating electrical oscillations, determining the variations in the frequencies of the electrical devices to ascertain the difference therebetween, and visibly registering said difference to indicate the velocity of travel of the waves through the formation.

5. The method of determining the velocity of propagation of electrical and seismic waves through sub-surface formations which includes, receiving the waves at predetermined spaced points, utilizing the waves received at each point for varying the frequency of a device generating electrical oscillations, and then comparing the frequencies of the devices to ascertain the differences therebetween to determine the rate of travel of the waves through the formation.

6. The combination with a transmitting unit for transmitting electrical waves into the sub-surface formation, of an apparatus including, a pair of spaced electrodes, a second pair of spaced electrodes located at a distance from the first pair of electrodes, an oscillator electrically connected to each pair of electrodes, whereby the frequency of the output of each oscillator is varied in accordance with the waves received by the electrodes connected with it, and means for determining the difference between the frequency variations of the two oscillators to ascertain the velocity of propagation of the waves through the formation.

7. The combination with a transmitting unit for transmitting electrical or seismic waves into the sub-surface formation, of an apparatus including, means for receiving the transmitted wave, a second receiving means located at a distance from the first receiving means, an oscillator electrically connected to each receiving means, whereby the frequency of the output of each oscillator is varied in accordance with the waves received by the receiving means connected with it, a mixer tube electrically connected with both oscillators for receiving the output thereof and to denote the difference in the frequency variations thereof, and a recording instrument electrically connected to the tube for visibly registering the difference as denoted by the tube.

8. The combination with a transmitting unit for transmitting electrical waves into the sub-surface formation, of an apparatus including, a pair of spaced electrodes, a second pair of spaced electrodes located at a distance from the first pair of electrodes, an oscillator electrically connected to each pair of electrodes, whereby the frequency of the output of each oscillator is varied in accordance with the waves received by the electrodes connected with it, means for determining the difference between the frequency variations of the two oscillators and means for visibly registering the difference between the frequency variations to visibly indicate the velocity of propagation of the waves through the formation.

9. The combination with a transmitting unit for transmitting electrical waves into the sub-surface formation, of an apparatus including, a pair of spaced electrodes, a second pair of spaced electrodes located at a distance from the first pair of electrodes, an oscillator electrically connected to each pair of electrodes, whereby the frequency of the output of each oscillator is varied in accordance with the waves received by the electrodes connected with it, a reference oscillator having an output of a predetermined frequency, and means for comparing the frequency variations of each of the oscillators which are connected to the electrodes, whereby the frequency variations of the oscillators, having connection with the electrodes, may be determined.

10. The combination with a transmitting unit for transmitting electrical waves into the sub-surface formation, of an apparatus including, a pair of spaced electrodes, a second pair of spaced electrodes located at a distance from the first pair of electrodes, an oscillator electrically connected to each pair of electrodes, whereby the frequency of the output of each oscillator is varied in accordance with the waves received by the electrodes connected with it, a reference oscillator having an output of a predetermined frequency, means for comparing the frequency variations of each of the oscillators which are connected to the electrodes, whereby the frequency variations of the oscillators, having connection with the electrodes, may be determined, and means for visibly registering the difference between the frequency variations to visibly indicate the velocity of propagation of the waves through the formation.

11. The combination with a transmitting unit for transmitting electrical waves into the sub-surface formation, of an apparatus including, a pair of spaced electrodes, a second pair of spaced electrodes located at a distance from the first pair of electrodes, an oscillator electrically connected to the first pair of electrodes, and adapted to have the frequency of its output varied in accordance with the waves received by said electrodes, a second oscillator connected to the second pair of receiving electrodes and having its frequency varied by the waves received by the second pair of electrodes, a mixer tube connected to one oscillator, a second mixer tube connected to the other oscillator, and a reference oscillator having a predetermined frequency and connected to the mixer tubes, whereby the frequency variations in the first two mentioned oscillators may be compared with the fixed frequency of the reference oscillator to determine the difference between such variations.

12. The combination with a transmitting unit for transmitting electrical waves into the sub-surface formation, of an apparatus including, a pair of spaced electrodes, a second pair of spaced electrodes located at a distance from the first pair of electrodes, an oscillator electrically connected to the first pair of electrodes, and adapted to have the frequency of its output varied in accordance with the waves received by said electrodes, a second oscillator connected to the second pair of receiving electrodes and having its frequency varied by the waves received by the second pair of electrodes, a mixer tube connected to one oscillator, a second mixer tube connected to the other oscillator, a reference oscillator having a predetermined frequency and connected to the mixer tubes, whereby the frequency variations in the first two mentioned oscillators may be compared with the fixed frequency of the reference oscillator to determine the difference between such variations, and means for visibly registering the difference between the frequency variations to visibly indicate the velocity of propagation of the waves through the formation.

13. The combination with a transmitting unit for transmitting an electrical current into the sub-surface formation, of an apparatus including, a vacuum tube oscillator electrically connected to the transmitter, whereby its frequency is varied in accordance with the current transmitted, a pair of receiving electrodes spaced from the transmitter and adapted to receive the current after it has traversed the sub-surface formation, a second oscillator connected to the receiving electrodes and having its frequency varied in accordance with the received current, and means for comparing the frequency variations of the two oscillators to determine the difference therebetween and thereby ascertain the velocity of propagation of the current through the sub-surface formation between the point of transmission and the point of reception.

14. The combination with a transmitting unit for transmitting an electrical current into the sub-surface formation, of an apparatus including, a vacuum tube oscillator electrically connected to the transmitter, whereby its frequency is varied in accordance with the current transmitted, a pair of receiving electrodes spaced from the transmitter and adapted to receive the current after it has traversed the sub-surface formation, a second oscillator connected to the receiving electrodes and having its frequency varied in accordance with the received current, means for comparing the frequency variations of the two oscillators to determine the difference therebetween and thereby ascertain the velocity of propagation of the current through the sub-surface formation between the point of transmission and the point of reception, and a recording instrument for visibly recording such difference.

GERALD M. HOWARD.